Figure 1:
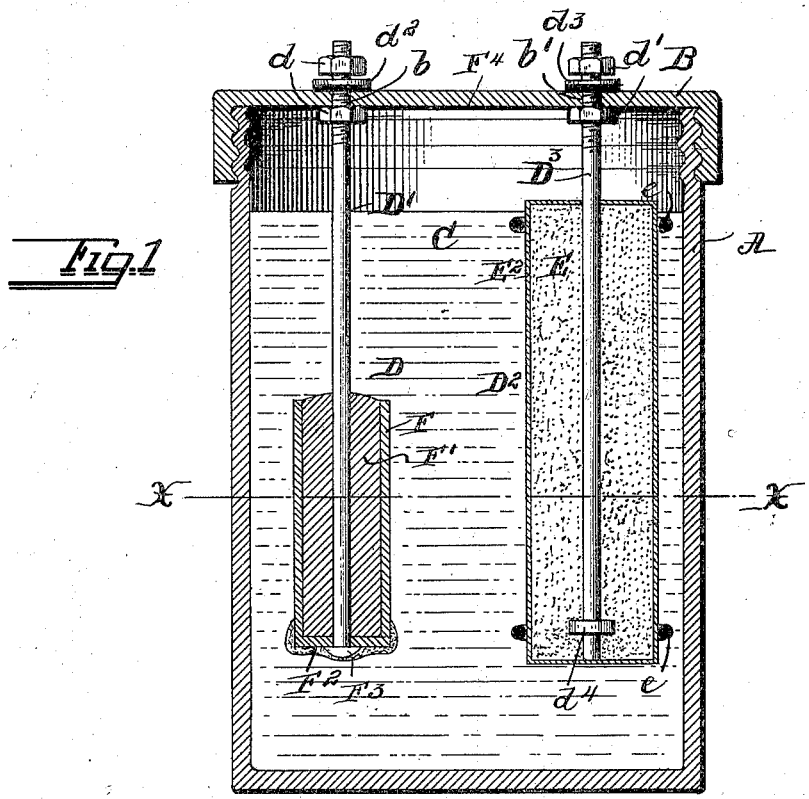

(No Model.)

I. KITSEE.
PRIMARY CELL.

No. 584,474. Patented June 15, 1897.

Witnesses
Jesse B. Heller
W. B. Eldridge

Inventor.

UNITED STATES PATENT OFFICE.

ISIDOR KITSEE, OF PHILADELPHIA, PENNSYLVANIA, ASSIGNOR TO THE KITSEE ELECTRIC COMPANY, OF SAME PLACE.

PRIMARY CELL.

SPECIFICATION forming part of Letters Patent No. 584,474, dated June 15, 1897.

Application filed September 15, 1896. Serial No. 605,903. (No model.)

*To all whom it may concern:*

Be it known that I, ISIDOR KITSEE, of the city and county of Philadelphia, State of Pennsylvania, have invented certain new and useful Improvements in Primary Cells, of which the following is a specification.

My invention relates to primary cells, and more specially to such of the one-fluid type.

The invention has more specially reference, first, to the mode or method of making or preparing the positive or zinc element, and, second, to the mode or method of making or preparing the negative or depolarizing element.

In primary cells the selection of the electrolyte is of great importance for the reason that the resistance of the different liquids greatly vary. Sulfuric acid, therefore, having the lowest resistance, would be preferred but for the reason that zinc, which is usually employed as the dissolving agent in such cells, has too great an affinity for the acid and dissolves even if the circuit is not closed. Different methods have been employed to overcome this difficulty, but I have found that the one hereinafter described has the great advantage of simplicity, compactness, and durability over the others known or described. As to the negative or depolarizing element, I have found that a salt of lead brought to a high state of oxidation is well adapted for its purpose, but economy bars out the employment in primary cells of oxidized lead not only for the reason that the charging, if done electrically, of each element separate requires an unnecessary amount of labor and handling, but also for the reason that where oxidized lead is exposed to the action of sulfuric acid after being partially discharged a slow sulfating takes place, resulting in the despoiling of the element.

In my experiments I have placed at different points batteries of different constructions, having more or less of the oxidized lead exposed to the electrolyte, and invariably a local action between the lead and the depolarizing element took place after partial discharge, if the battery was idle for about one or two weeks. An element, therefore, which is so constructed as to expose part of its conductor to the electrolyte cannot be effectually used in primary cells employed for open-circuit work. It is therefore necessary to surround the conductor proper entirely with a mass, and a very compact mass at that, of the high oxid; but repeated experiments have proven that it is hardly possible to compress a solid mass of low oxid around a conductor and electrically charge the so-compacted mass to the point of highest oxidation without breaking or cracking the mass in the process of formation. In my experiments I have repeatedly manufactured such elements with the greatest possible care, using a very slight current at the beginning and discharging every third day of the charge, so that nearly one month was consumed in bringing one set of such elements to the required standard, and yet it was not possible to obtain perfect success. Cracking and breaking up could not be entirely obviated. For this and other potent reasons I have recourse to the method as later on to be described.

Figure 2:
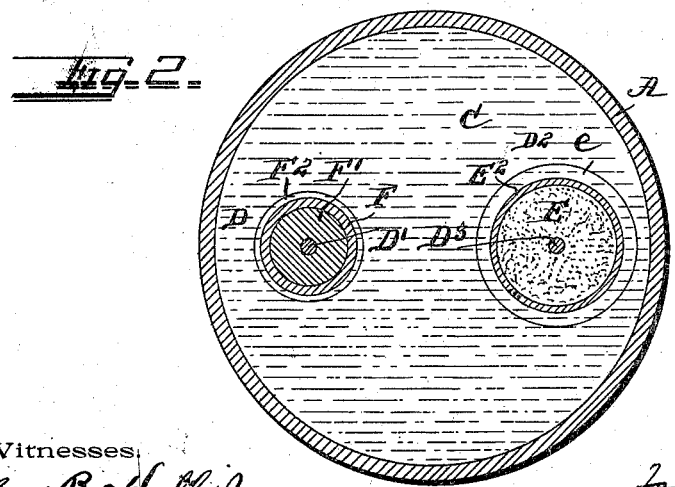

Referring to the drawings, in which similar letters indicate similar parts, Figure 1 is a vertical section. Fig. 2 is a section on line $x\ x$ of Fig. 1.

A is the containing vessel, preferably of cylindrical form, so as to be enabled to have the cap screwed to the top of the jar, thereby making an air-tight joint, which is of advantage to prevent a great deal of evaporation and creeping of salt.

B is the cap or cover, both being screw-threaded, as shown at $a$.

D is the positive or zinc element as an entirety, of which D' is the supporting-conductor in the shape of a rod, preferably of copper; F', the element proper, consisting of an amalgam of zinc and mercury or lead and mercury, as the case may be; F, the cup containing the compound F'; $F^3$, a rivet-head or other protuberance preventing the rod D' from slipping through the orifice of the cup F; $F^2$, a cement surrounding the lower part of said cup.

The *modus operandi* of preparing the element is the following: A cup, preferably in the shape of a round vessel, one inch in diameter by two inches high, is provided at its bottom with an orifice large enough for the conducting-rod to pass through. The lower end of the rod is flattened or provided with a washer, so that when placed in position, as shown in Fig. 1, it is prevented from slipping off the cup. The compound in a molten state is then poured into the cup, filling it entirely. After cooling the lower part of the filled cup is dipped into a cement, so as to seal its perforated bottom effectually. In my experiments I have found that such is a necessary precaution, as otherwise the mercury, which may become free through the dissolving of the zinc or sulfating of the head, due to the action of the electrolyte if the battery is working, may ooze out through the perforated bottom. The cement preferably consists of equal parts of rosin and pitch intermixed with a small proportion of wax.

I am aware that—as, for instance, in the so-called "fuller" or like cells—the positive or zinc element is placed in connection with free mercury in a receptacle, but such is not my intention. Having found that elements of such description do not work well and are not easily transportable, I had recourse to the method as above described, in which the whole mass is as an entirety poured in its molten state into its cup, filling the same entirely with one solid mass, no free mercury being present. In following out this method or process the sole and only object is to practically make out of the three parts—the conductor, the metal, and the cup—one mechanical unit, which unit I am aware may also be established by first casting the metal and then providing the metal with a tight-fitting cup; but I have found in my experiments that such requires great care and that even the slightest space between metal and cup is a disadvantage, and I therefore prefer the process of casting the metal into the cup.

$D^2$ is the negative or depolarizing element as an entirety. $D^3$ is the conductor proper. E is the depolarizing compound, and $E^2$ the non-conducting envelop surrounding the compound. The conductor $D^3$ is at its lower end provided with the enlargement $d^4$. Said enlargement is preferably provided so as to give the depolarizing compound a better support on the conductor. Rubber bands $e$ are preferably surrounding the compound with its envelop.

The method of preparing the element is the following: A salt of lead, preferably a low oxid, is in bulk brought to the highest state of oxidation, preferably through the action of the electric current. The high oxid is then powdered and in suitable molds, provided with conducting-rods, compacted around said rods under high pressure. It is preferred to make the conducting-rod about three-eighths of an inch and the surrounding mass about five-eighths of an inch in diameter. As said above, it is of great importance that no part of the conductor shall be in direct contact with the electrolyte, and therefore the depolarizing mass should surround the conductor entirely so far as said conductor is designed to be immersed in the electrolyte.

In my experiments I was a great deal annoyed by the fact that the compressed depolarizing compound commenced to drop off as soon as the outside circuit was closed, which very often resulted in the entire disintegration of the whole element. A low oxid, such as red lead or a sulfate of chlorid of other material, may be added to the depolarizing compound in the process of compression as a binding material; but all such means only lessen the electric properties of the compound proper, establish local action, and reduce the high oxid to a low oxid.

After experimenting with different material I have found a simple solution of the question in the dipping of the element in a plastic mixture of plaster-of-paris and water, thereby providing the whole with an outer and thin envelop of plaster-of-paris or gypsum, and repeated experiments have convinced me that such envelop is a necessity if the negative element consists of a conductor having compressed thereon a high oxid of lead brought to its high state of oxidation with the aid of the electric current independent of its conductor. It should be clearly understood that the outer envelop does not add directly to the efficiency of the negative element, but only indirectly in so far as it fulfils the office of a non-conducting material, keeping mechanically the different parts out of which the negative element consists together. This outer envelop is also beneficial for the reason that the depolarizing compound, being of an unstable nature, if accidentally coming in contact with some salts of other materials, such as a chlorid of ammonia or other chlorids or bromids or nitrates, may lose a great part of its oxygen and therefore usefulness.

Both of the elements are preferably secured to the cover or cap in the following manner: The upper part of the rods are screw-threaded. A nut is placed on the lower end of the thread and the upper part of the rod carried through the hole with which the cover is provided. The rod is secured to the cover with the aid of a second nut and washer, so as to provide effectually against any leakage or creeping of salt. It is well understood that wires for the outside circuit can be secured, either with or without the aid of additional nuts, to the upper parts of the rods. I have found it advantageous to cover the first-mentioned nut and, in fact, the whole inner part of the top of the cover with cement.

In the drawings the nuts of the positive element are designated by the letter $d$. $d^2$ is a washer which is interposed between the upper nut and the cover B. $b$ is the screw-threaded portion of the rod $D'$. The nuts of the negative element are designated by the letter $d'$, and $d^3$ is a washer interposed between the upper nut and the cover B. $b'$ is the screw-threaded portion of the rod $D^3$. The negative element may also be provided with the rubber rings $e$.

As an electrolyte I use diluted sulfuric acid, and such an electrolyte is designated in the drawings by C.

It is unnecessary for me to point out more particularly the material of the vessel A and the cap or cover B. Both may be of glass, hard rubber, porcelain, or any other composition capable of fulfilling the office of a containing jar and cover, but both should be of non-conducting material. The cup F, I have made of copper, brass, wood, and porcelain, and the selection of such material lies within the scope of the person manufacturing such cell.

Having now described my invention, what I claim as new, and desire to secure by Letters Patent, is—

1. A positive element consisting of a containing-cup of a material designed to remain inert, a conducting-rod passing through the cup and a solid body of an alloy of mercury and a metal, as zinc, cast so as to fill the space between said cup and rod, the surface of said solid body only being exposed.

2. In a positive element a containing-cup provided with a perforation at the bottom through which a metallic rod designed to act as a conductor passes, and an alloy cast so as to fill the space between said rod and cup the lower part or bottom of said containing-cup being covered with a cement.

3. The method of preparing a negative element for primary cells which consists in: first, bringing a low oxid of lead to a higher state of oxidation through the action of an electric current, in, secondly, compressing the powdered high oxid of lead around a metallic rod, embedding the same effectually in said compound, and thirdly, providing the whole with an outer layer of plaster-of-paris.

4. An improved primary cell consisting of a vessel containing dilute sulfuric acid as an electrolyte, a positive element consisting of a containing-cup, a conducting-rod, a solid body of an alloy of zinc and mercury cast between said cup and rod, and a negative element having compressed thereon a high oxid of lead, both the positive as well as negative element being suspended from the cap or cover of the containing vessel.

5. An improved primary cell consisting of a vessel containing dilute sulfuric acid as an electrolyte, a positive element and a negative element said negative element consisting of a conducting-rod having compressed thereon a high oxid of lead held together by an outside layer of plaster-of-paris.

6. A negative element for primary cells consisting of a metallic rod surrounded as to all its parts designed to be immersed in the electrolyte, with a high oxid of lead, said high oxid of lead being surrounded or enveloped by plaster-of-paris.

In testimony whereof I sign my name, this 14th day of September, 1896, in the presence of two subscribing witnesses.

ISIDOR KITSEE.

Witnesses:
W. B. ELDRIDGE,
GEO. M. COSTELLO.